United States Patent Office 3,565,595
Patented Feb. 23, 1971

3,565,595
PRODUCTION OF POWDERED CRISTOBALITE
Philip Hedley Gaskell, Chorley, and Francis John Grove, St. Helens, England, assignors to Pilkington Brothers Limited, Liverpool, Lancashire, England, a corporation of Great Britain
No Drawing. Filed Mar. 18, 1968, Ser. No. 714,088
Claims priority, application Great Britain, Mar. 23, 1967, 13,817/67
Int. Cl. C03b 33/00
U.S. Cl. 65—21                                    6 Claims

ABSTRACT OF THE DISCLOSURE

Powdered silica, in the form of iron-free powdered cristobalite, for use as a glass match material is produced by heating quartz aggregate to produce cristobalite crystals, pulverising the crystals without contamination, and leaching iron from the crystals.

BACKGROUND OF THE INVENTION

This invention relates to the production of powdered silica in the form of powdered cristobalite for use as a constituent of a batch of glass forming materials.

It is the main object of the present invention to produce high purity powdered cristobalite of very low iron content for use in the manufacture of high quality optical glass.

SUMMARY

According to the invention a method for the production from quartz aggregate of powdered cristobalite for use as a constituent of a glass making batch, comprises the steps of heating quartz to a temperature in the range of 1400° C. to 1700° C. for a time sufficient to produce cristobalite crystals, and pulverising the crystals to a powder during which pulverisation the crystals only contact surfaces of a material which does not contaminate the powder, and an intermediate washing step employing an acid to leach away any iron originally present in the quartz aggregate.

One method according to the invention comprises heating quartz aggregate through 575° C. to shatter the quartz aggregate into smaller crystals, washing the crystals with an acid to leach away iron from the crystal surfaces, then maintaining the crystals at a temperature in the range 1400° C. to 1700°C., and crushing the cristobalite so formed to a powder between surfaces of a material which does not contaminate the powder.

This method of operating the invention thus makes use of the known property of quartz whereby on heating quartz crystals through a temperature in the region of 575° C. a modification of crystalline form of the quartz takes place with a resulting expansion which is utilized to cause shattering of the quartz aggregate into smaller crystals. This shattering takes place along the planes of contact of the quartz crystals.

The iron content of quartz tends to be concentrated in the planes of contact between the crystals, that is the planes along which the crystals cleave as they are heated through 575° C., and the washing of the crystals, after this shattering, with an acid leaches the iron away from the crystal surfaces, as well as removing any iron stains which might be present on the quartz due for example to contact of the quartz with the tools used in the mining and handling of the quartz.

The quartz crystals, following the acid washing, are substantially free from iron and these crystals are then heated to a temperature in the range 1400° C. to 1700° C. to transform the quartz crystals into cristobalite. The volume change of 10% to 15% which takes place during the transformation into cristobalite results in a friable mass which can then be easily pulverised by being pressed or crushed between surfaces which do not contaminate the powder which is powdered cristobalite having a very high degree of purity.

It has been found that the effectiveness of the first step of heating the quartz to shatter it into crystals before the acid washing of these crystals can be improved if this initial heating of the quartz is effected cyclically a number of times through a temperature range centered on 575° C. By cycling the temperature of the quartz through the transformation temperature the large blocks of quartz are rapidly reduced in size as the large lumps shatter into smaller crystals β-quartz.

The preferred acid for washing the quartz crystals so produced is an acid solution containing 5% hydrochloric acid and 1% hydrofluoric acid. After the acid treatment the crystals are washed with water, filtered and dried and are then ready for subjection to the final pulverisation step of the method.

The speed of conversion of the washed quartz crystals into cristobalite depends on the temperature to which the crystals are heated.

In a preferred method according to the invention the quartz crystals after acid washing are subjected to a temperature of about 1600° C. for about 30 minutes, and the fragmentary cristobalite so formed is crushed after cooling between rollers of rubber or a plastic material. Very little force is required to crush the fragmentary cristobalite and therefore soft materials such as rubber or plastics which do not contaminate the powdered cristobalite so produced can be used and there is no danger of contamination of the cristobalite.

In another method of operating the invention, the initial shattering of the quartz is not effected cyclically and acid washing follows the transformation to cristobalite. This method provides maintaining the quartz aggregate at about 1500° C. to transform the quartz to cristobalite, washing the cristobalite so formed with an acid to leach away any iron present, and then pulverising the cristobalite.

DESCRIPTION OF THE PREFERRED EMBODIMENTS

Example I

South African lump quartz in the form of pieces weighing between 400 to 700 grammes was heated and in the course of its initial heating was cycled twice through the transition temperature of 575° C. The quartz lumps were then quenched in water and the resulting smaller quartz crystals ranged in size from about 4 cm. to actual powder form. This mixture of crystals of various sizes was then leached with an acid solution containing 5% hydrochloric acid and 1% hydrofluoric acid for 60 minutes, and after the leaching, which dissolved iron from the surfaces of the crystals, the crystals were washed with water until acid-free. Then the crystals were dried and heated to a temperature of about 1,580° C. and were maintained at that temperature for about 30 minutes. By the end of that period the conversion of the quartz into cristobalite was 98% complete and the resulting friable mass was crushed between rubber rollers to give a very finely divided form of powdered silica of high purity.

The initial iron content of the rock quartz is contained mainly in the planes of contact between crystals and a concentration of about 800 parts per million can occur, although more usually the average iron content is of the order of 20 to 60 parts per million; while the powdered silica resulting from the process of the invention has an iron content of about 3 to 5 parts per million.

Example II

A batch of about 200 kg. of lump quartz aggregate was fed to a gas fired furnace and maintained at about 1500° C. for 4 hours to transform the quartz into cristobalite.

The cristobalite was discharged from the furnace to a refractory line hopper in which it was cooled to room temperature by a current of air forced through the material. Then the cristobalite was passed to a washing stage where it was leached with an acid solution containing 5% hydrochloric acid and 1% hydrofluoric acid and was washed until acid free, filtered and dried.

The material was then crushed in a jaw crusher with non-contaminating jaws and from the crusher was fed into a rubber-lined, vibro-energy mill where it was pulverised by autogenous grinding.

Particulate material from the mill is fed to a rubber-lined cyclone, and the bottom discharge from the cyclone is high-purity, powdered silica for use as a constituent of a glass making batch.

It has been found that the powdered "iron-free" silica made by the present invention has improved melting characteristics in glass making and in particular the powdered cristobalite has a high initial melting rate and so the actual melting process in the manufacture of optical glass is improved.

The use of powdered "iron free" silica produced by the method of the invention enables optical glasses of vastly improved transmission characteristics in the ultra-violet region to be achieved. Transmission in the visible and the near infra-red regions is also improved.

The silica in the form of powdered cristobalite is, as already mentioned, advantageous in glass melting since with the powdered cristobalite it has been found that diffusion of reacting oxides in the glass melting process is enhanced, and in fact the speed of the reaction is increased by about a factor of two as compared with the conventional silica in the form of sand or crushed quartz.

The iron content is practically eliminated by the leaching of iron from the crystal planes exposed during the heating of the quartz, and even greater reduction of the iron content is achieved by acid washing the friable cristobalite mass. Since the cristobalite is a very porous material diffusion of acid through the grain boundaries takes places rapidly and there is a high efficiency of leaching of acid from the cristobalite.

The invention also comprehends powdered silica produced by a method of the present invention characterised in that the amount of iron impurity in the silica is at most five parts per million.

The invention further comprehends glass forming batch for use in making optical glass including powdered cristobalite produced by the method of the invention, and glass produced by melting that batch.

We claim:
1. A method for the production from quartz aggregate of powdered cristobalite for use as a constituent of a glass-making batch, comprising the steps of heating quartz to a temperature in the range 1,400° C. to 1,700° C. for a time sufficient to produce cristobalite crystals, pulverising the cristobalite crystals to produce the powdered cristobalite, employing for said pulverisation surfaces rubber or plastic material which does not contaminate the cristobalite, and ensuring the crystals contact only those surfaces during said pulverisation.

2. A method according to claim 1, comprising heating quartz aggregate through 575° C. to shatter the quartz aggregate into smaller crystals of β-quartz, washing the β-quartz crystals with an acid to leach away iron from the crystal surfaces, then maintaining the crystals at a temperature in the range 1,400° C. to 1,700° C. to convert said acid-washed β-quartz crystals into cristobalite.

3. A method according to claim 2, wherein the initial heating of the quartz is effected cyclically a number of times through a temperature range centred on 575° C.

4. A method according to claim 2, wherein the β-quartz crystals, after acid washing, are subjected to a temperature of about 1,600° C. for about 30 minutes, and the fragmentary cristobalite so formed is crushed, after cooling, between rollers of rubber or a plastics material.

5. A method according to claim 1, comprising maintaining the quartz aggregate at about 1,500° C. to transform the quartz to cristobalite, washing the cristobalite so formed with an acid to leach away any iron present, and then pulverising the cristobalite.

6. A method according to claim 1, including, prior to said pulverisation, an intermediate washing step employing an acid to leach away iron originally present in the quartz aggregate.

References Cited

UNITED STATES PATENTS 2,952,516   9/1960   Gross _____ 23—182

FOREIGN PATENTS 510,081   7/1939   Great Briatain _____ 65—18

ARTHUR D. KELLOGG, Primary Examiner

U.S. Cl. X.R.

23—312; 65—31, 33, 62